(12) United States Patent
Holaday

(10) Patent No.: US 7,193,505 B2
(45) Date of Patent: Mar. 20, 2007

(54) CHANNEL-TO-CHANNEL COMPARE

(75) Inventor: David A. Holaday, Cornelius, OR (US)

(73) Assignee: Tektronix, Inc., Beaverton, OR (US)

( * ) Notice: Subject to any disclaimer, the term of this patent is extended or adjusted under 35 U.S.C. 154(b) by 143 days.

(21) Appl. No.: 10/938,980

(22) Filed: Sep. 9, 2004

(65) Prior Publication Data

US 2006/0049919 A1     Mar. 9, 2006

(51) Int. Cl.
*G05B 1/00* (2006.01)
*G06F 7/02* (2006.01)

(52) U.S. Cl. ..................... 340/146.2; 327/77
(58) Field of Classification Search ............... None
See application file for complete search history.

(56) References Cited

U.S. PATENT DOCUMENTS

| | | | | |
|---|---|---|---|---|
| 4,823,076 A | | 4/1989 | Haines et al. ........... 324/121 R |
| 5,257,216 A | * | 10/1993 | Sweedler ................... 708/498 |
| 5,283,893 A | * | 2/1994 | Penn ............................ 707/7 |
| 5,515,306 A | * | 5/1996 | Blaner et al. ............... 708/207 |
| 5,550,528 A | * | 8/1996 | Offord et al. ............ 340/146.2 |
| 5,742,224 A | * | 4/1998 | Gadducci et al. ........ 340/146.2 |
| 6,114,945 A | * | 9/2000 | Houston ................. 340/146.2 |

* cited by examiner

*Primary Examiner*—Tuan T. Lam
(74) *Attorney, Agent, or Firm*—Francis I. Gray; Thomas F. Lenihan

(57) ABSTRACT

A word recognizer for providing a channel-to-channel compare for an input digital signal divides channels of the input digital signal into equal-width input signal channel paths. One input signal channel path serves as a reference value for comparison with the other input signal channel path to produce the channel-to-channel compare.

5 Claims, 1 Drawing Sheet

CHANNEL-TO-CHANNEL COMPARE

BACKGROUND OF THE INVENTION

The present invention relates to logical triggering, and more particularly to a channel-to-channel compare word recognizer for a logic analyzer.

In logic analyzers a word recognizer is a common triggering resource. As shown in FIG. 1 and in U.S. Pat. No. 4,823,076, an input digital signal having n logic channels, or n-bit words, is compared against a programmed m-bit reference value, where m<=n. The word recognizer output indicates whether the input digital signal, or selected channels thereof as determined by an n-bit mask value, matches the reference value. The reference value is static, i.e., the reference value is programmed before a data acquisition is started and is not reprogrammed while the data acquisition is ongoing.

For reliability issues some digital designs include redundant circuits. The redundant circuits run in parallel doing the same tasks, so both circuits should produce the same results. If the redundant circuits end up with different results, the designer needs to track down where the circuits diverged from each other.

On some wide digital buses the bit lines are broken into sections. The data on some of the sections may occur on different clock edges, but the logic analyzer ends up combining them into a single sample. When testing these buses, one test is to put redundant data on section 0 and section 2 and different redundant data on section 1 and section 3. Different data patterns are placed on the section pairs throughout the test. For each section pair the data patterns should always equal each other.

In the above two cases it is desired to compare input signal data channels against other data channels of the same input signal. Having a static programmed reference value for the word recognizer makes these problems impossible to solve.

What is desired is a means for comparing channels of data from an input signal with each other where the information on the compared channels is redundant.

BRIEF SUMMARY OF THE INVENTION

Accordingly the present invention provides a channel-to-channel compare word recognizer. An input digital signal is divided into two input signal channel paths of equal width. Respective pairs of channels from the two input signal channel paths are compared in a comparator to produce a result when there is a difference between any one of the channel pairs.

The objects, advantages and other novel features of the present invention are apparent from the following detailed description when read in conjunction with the appended claims and attached drawing.

DETAILED DESCRIPTION OF THE INVENTION

Figure 1:
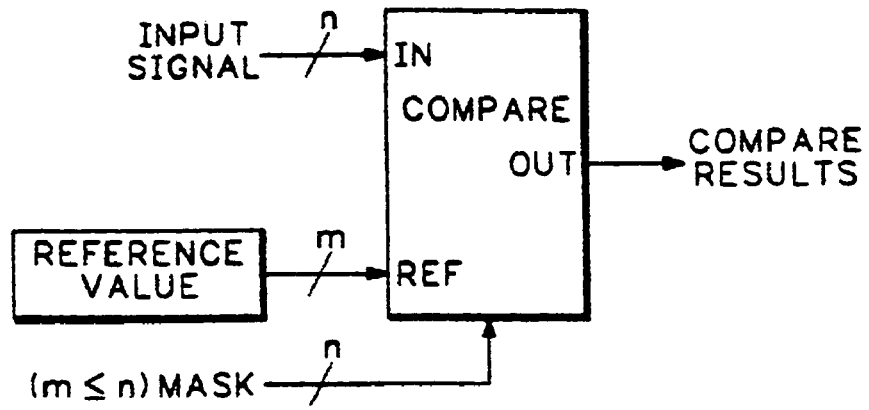
FIG. 1 is a simple block diagram view of a conventional word recognizer according to the prior art.
Figure 2:
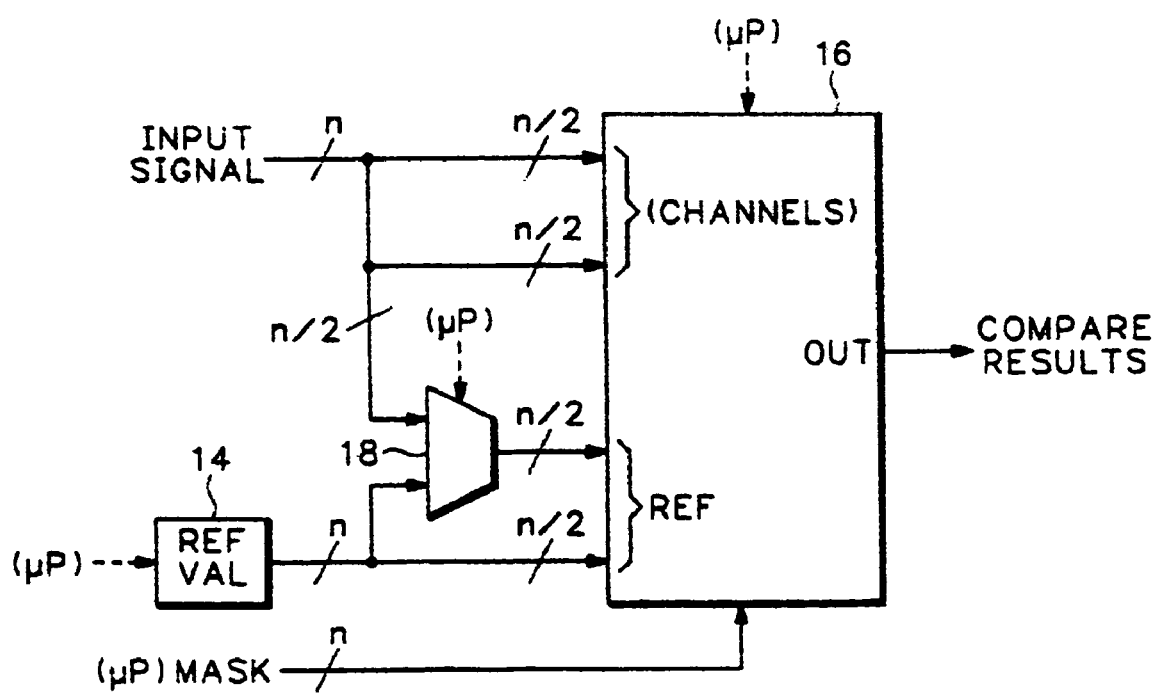
FIG. 2 is a simple block diagram view of a word recognizer including a channel-to-channel compare capability according to the present invention.

Referring now to FIG. 2 an input signal having n logic channels, or n-bit words, is divided into equal-width input signal channel paths, an upper input signal channel path and a lower input signal channel path. Both input signal channel paths are input directly to a comparator 16, as in the conventional word recognizer of FIG. 1. However the lower input signal channel path also is input to a selector 18. As in the conventional configuration a programmed n-bit reference value may be loaded into a reference register 14. The output from the reference register 14 likewise is divided into equal-width reference channel paths, an upper reference channel path and a lower reference channel path. The upper reference channel path is input to the selector 18 and the lower reference channel path is input directly to the comparator 16. The output from the selector 18 provides the upper reference channel path to the comparator 16 either from the input signal or the reference value. A mask signal is provided, as is conventional, to the comparator 16. Selector control signals, the mask signal, the programmed reference value and control of the comparator 16 are all provided by a processor, as is well known in the art.

In operation an operator selects a mode of operation—conventional or channel-to-channel. In the channel-to-channel compare configuration the selector 18 provides the lower input signal channel path as the upper reference channel path to the comparator 16. The mask signal input to the comparator 16 blanks out, or disables, the lower input signal channel path and the lower reference channel path, while enabling corresponding channels of the upper input signal channel path and the upper reference channel path. In this way corresponding channels of the input signal are compared by the word recognizer dynamically. In a conventional compare configuration the selector 18 provides the upper reference channel path from the reference register 14 to the comparator 16, and the mask signal selects which channels of the input signal to compare with the reference value.

Thus the present invention provides a channel-to-channel compare capability in a word recognizer by dividing an input digital signal into equal-width input signal channel paths, and comparing corresponding pairs of the channels from the input signal channel paths to produce a result when there is a difference between the input signal channel paths.

What is claimed is:

1. An improved word recognizer of the type having a comparator for comparing selected channels of an input digital signal with a reference value in which the improvement comprises means for driving the input digital signal in to two equal-width input signal channel paths, with one input signal channel path providing the reference value and the other input signal channel path providing the selected channels, thereby producing a channel-to-channel compare between selected channel pairs of the input digital signal; and further comprising means for selecting as the reference value either a preprogrammed reference value for conventional comparison with the input digital signal or one of the input signal channel paths for the channel-to-channel compare.

2. A channel to channel compare arrangement for use in a logic analyzer, comprising:

a bus having an n-bit data path, including an upper n/2-bit data path conveying a data word from a first channel, and a lower n/2-bit data path conveying a data word from a second channel;

an n/2-bit selector for selecting between a first and a second mode of operation;

a comparator having an upper data input coupled to said upper n/2 data path, a lower data input coupled to said lower n/2 data path, a lower reference input coupled to a lower n/2 reference path, an upper reference input selectively coupled by said selector to said upper n/2 reference path in said first mode of operation, and to said lower n/2 data path in said second mode of operation, and having an n-bit mask input; and a controller, said controller controlling the operation of said n/2-bit selector, and applying a mask word to said n-bit mask input;

wherein, in said first mode of operation, said comparator compares data of said upper n/2 data path with selected data of said upper n/2 reference path; and compares data of said lower n/2 data path with data of said lower n/2 reference path; and in said second mode of operation, said comparator compares data of said upper n/2 data path with selected data of said lower n/2 data path, and in response to said n-bit mask data, does not compare data of said lower n/2 data path with data of said lower n/2 reference path, said comparator producing an output in said first and second modes of operation indicative of the non-equality said data being compared.

3. A channel to channel compare arrangement, comprising:

a first data path conveying a data word from a first channel, and second data path conveying a data word from a second channel;

a first reference path conveying a first reference word, and a second reference path conveying a second reference word;

said first data path, said second data path, said first reference path and said second reference path all conveying words having the same number of bits;

a comparator having an first data input coupled to said first data path, a second data input coupled to said second data path, a mask input coupled to receive a mask word, a second reference input coupled to said second reference path, and a first reference input;

a selector having an output coupled to said first reference input of said comparator, and selectively coupling said first reference path or said second data path to said first reference input of said comparator, and a controller controlling the operation of said selector, and applying a mask word to said mask input.

4. The channel to channel compare arrangement of claim 3, wherein, said first reference input of said comparator is selectively coupled by said selector to said first reference path in a first mode of operation, and to said second data path in a second mode of operation.

5. The channel to channel compare arrangement of claim 4, wherein, in said first mode of operation, said comparator compares data of said upper first data path with selected data of said first reference path, and compares data of said second data path with data of said second reference path; and in said second mode of operation, said comparator compares data of said first data path with selected data of said second data path; and in response to said mask data, does not compare data of said second data path with data of said second reference path;

said comparator producing an output in said first and second modes of operation indicative of the non-equality said data being compared.

* * * * *